United States Patent [19]
Baker et al.

[11] 4,040,751
[45] Aug. 9, 1977

[54] UNICELL PHOTOMETER DEVICE

[75] Inventors: Philip G. Baker, Peabody; Bruce K. Johnson, Andover, both of Mass.

[73] Assignee: Polaroid Corporation, Cambridge, Mass.

[21] Appl. No.: 648,651

[22] Filed: Jan. 13, 1976

[51] Int. Cl.$^2$ .......................... G01J 1/42; H01J 3/14
[52] U.S. Cl. .............................. 356/225; 250/237 R
[58] Field of Search ................. 250/237 R, 239, 216; 356/225, 221, 224; 350/266, 194

[56] References Cited

U.S. PATENT DOCUMENTS

| | | | |
|---|---|---|---|
| 2,227,166 | 12/1940 | Tönnies | 356/224 |
| 2,293,576 | 8/1942 | Townsley | 356/225 |

FOREIGN PATENT DOCUMENTS

| | | | |
|---|---|---|---|
| 788,385 | 10/1936 | France | 356/225 |
| 1,072,823 | 1/1960 | Germany | 356/225 |

*Primary Examiner*—John K. Corbin
*Assistant Examiner*—Rolf Hille
*Attorney, Agent, or Firm*—Francis J. Caufield

[57] ABSTRACT

A unicell radiation measuring device having a single electrical output signal that can be correlated with film sensitometric characteristics and scene object luminance patterns to either predict photographic exposures directly, or alternatively, used as an input function for controlling a camera exposure control system. The device consists of an optical system having a single optical element for collecting and directing radiation from a scene onto the surface of a photoelectric transducer element having a spectral sensitivity substantially identical to the photopic visual response curve of the standard photometric observer according to the CIE thereby qualifying it as a photometer. The optical element consists of a central circular planar portion of uniform thickness surrounded by an annular positive lens portion having radially decreasing thickness. Both portions are integrally molded to provide the optical element with a unitary construction that is rotationally symmetric. The optical element functions to provide the device with a preferred directional response pattern that selectively weights the radiation received from objects distributed throughout a scene and also optimizes the transfer function of the device.

10 Claims, 7 Drawing Figures

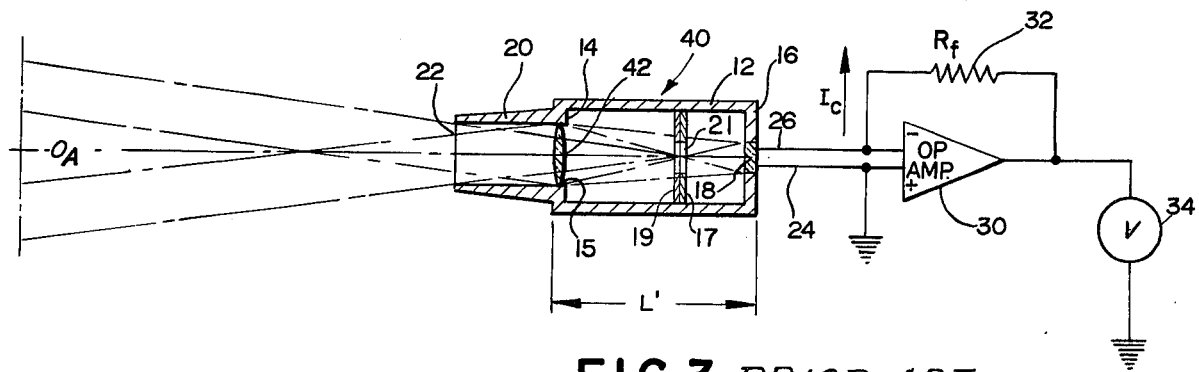
FIG. 3 *PRIOR ART*
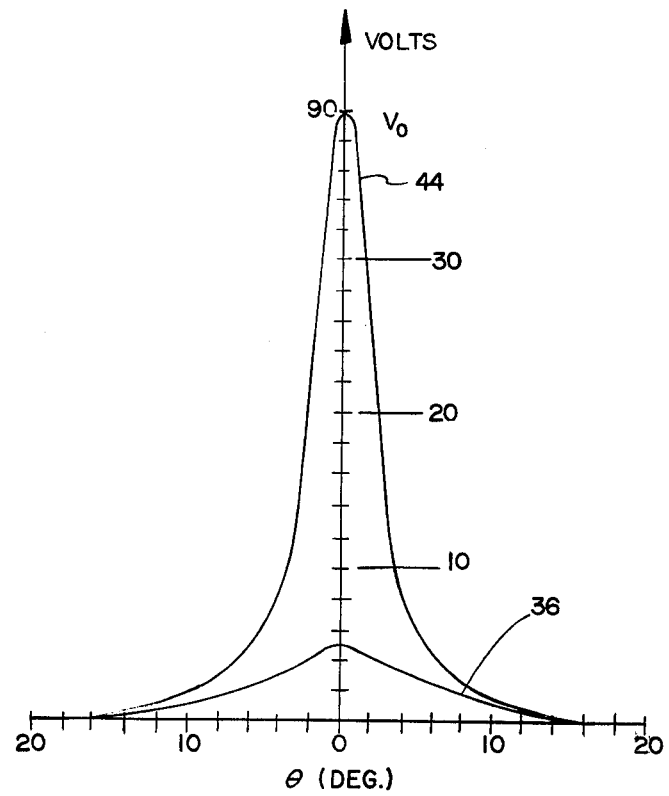
FIG. 4 *PRIOR ART*

UNICELL PHOTOMETER DEVICE

BACKGROUND OF THE INVENTION

1. Field of the Invention

This invention relates to photography and, more particularly, to photoelectric photometers such as the unicell photometer for use in exposure control applications.

2. Background of the Prior Art

The use of unicell photometers for evaluating scene luminances to predict exposures is well known in the prior art.

These devices generally consist of a photosensitive detector and an optical system for collecting radiant energy from a scene and directing it onto a surface of the photosensitive detector. The detector is usually a photoelectric transducer which integrates the total energy incident on its surface and converts it to an electric signal. The strength of the signal is used as an indication of what the exposure should be, based on the sensitometric characteristics of the film being used and what the photographer regards as his subject.

For anyone who must use or design them, the exact meaning of what the single output of the detector represents, in terms of its relationship to scene characteristics, is one of the most troublesome aspects of the unicell photometer. To understand this statement, consider what takes place when a unicell photometer is aimed at a scene to be photographed. The scene, in general, includes a number of objects, luminance sources, scattered throughout it in a more or less random pattern. The optical system of the photometer collects all the radiation from all of these objects within its field of view. The detector, in turn, responds to the radiation from each of the sources by summing up the individual responses that can be attributed to each object. The result is a single electrical signal which may or may not be interpreted as representing an average scene brightness for purposes of predicting the exposure. However, even if it is interpreted as being the average, that decision may not be appropriate if those objects that are considered to be the subject substantially differ in brightness from the average, or worse, fall outside the response capability of the film.

In spite of this fundamental drawback, the unicell photometer still remains attractive because of its simplicity and cost. Moreover certain steps can be taken to minimize errors by carefully analyzing those factors that produce them. For example, it has been found that the performance of the unicell photometer as an exposure predictor or discriminator is a strong function of its directional response. Therefore, by controlling the directional response, it is possible to improve exposure prediction capability if certain assumptions are made concerning the probability of occurrence of the distribution of object luminances, both in space and time, for typical scenes. With both these factors known, the directional response and the scene luminance distribution, to a degree of certainty, the designer is in a position to begin to make more sense out of what the single detector output represents.

For example, if the relative response of the detector to an object located ten degrees off axis is, say, 30 percent of its on-axis response, and the probability of an important object being located in the scene at that location is high, that object is very likely going to be misexposed given the fact that most subjects are predominantly near the central axis. Under these conditions, correction to the directional response pattern may be well advised.

The implication being made here is not what the directional response should be; there seems to be a fair amount of controversy regarding that issue in the industry. Each manufacturer has his own preference based on his own research into these matters. The important point is to recognize that the directional response pattern can be used to significantly improve exposure prediction performance in unicell photometers. Unfortunately, the directional response patterns of unicell photometers assume rather characteristic shapes once their geometric configuration is established, and the degree to which those shapes can be altered by manipulating design parameters is limited. Consequently, any reduction in the available design degrees of freedom greatly hampers a designer's ability to achieve a particular response pattern.

Usually the parameters that influence the response pattern are detector size, local surface sensitivity of the detector, the optics of the collecting system, and the distance separating the detector and optical system.

The present invention is concerned with a predetector optical system that may be used to successfully achieve a preferred directional response pattern when the distance from the detector to the optical system is a design constraint. In addition, the transfer function, or the amount of energy collected by the optical system compared to the amount available for collection, is maximized.

SUMMARY OF THE INVENTION

One of the most troublesome aspects of unicell photometers used in photographic exposure control applications is related to the fact that they yield only a single output signal in response to radiation received from a variety of objects scattered throughout the scene. The central problem is to correlate the single output with an exposure value that is appropriate for the sensitometric characteristics of the film being used and what the photographer considers as his subject. Because of the intrinsic nature of the unicell photometers, this correlation necessarily represents a compromise because, in general, no single output can be representative of the subject when it occupies only part of the scene. However, the probability of predicting an acceptable compromise exposure can be optimized if the photometer can be provided with a directional response function that selectively assigns more or less importance to scene objects based on the probability of certain reoccuring object luminance distribution patterns both in space and time.

The exact directional response pattern may be a topic of controversy in the industry, however, since not all practitioners would agree on what it should be.

The preferred embodiment of the present invention is a unicell photometer device having a preferred directional response function that is achieved by providing it with an optical element that directs object radiation in a predetermined way onto a uniformly sensitive surface of a photoelectric transducer located behind it.

The transducer response to incident radiation from the objects by providing a single output signal that is proportional to the sum of the individual responses that are attributable to and can be related to the individual scene objects. The single output may be used to directly predict exposure or, alternatively, the photometer device can be used as an integral component of a camera having a pair of scanning aperture blades to modulate the output so that it can be used as an input to control an exposure control system. The optical element consists of a central circular planar portion of uniform thickness surrounded by an annular positive lens portion having radially decreasing thickness. Both portions are integrally molded into a single unitary piece adapted for mounting in a forward wall section of the device. Extending outwardly from the forward wall is a cylindrical flare hood for blocking stray radiation. The annular positive lens portion of the optical element eliminates barrel vignetting associated with the flare hood thereby improving the efficiency of the device while the central portion of the element tends to distribute radiation outwardly from the center of the surface of the transducer.

An object of the invention is to provide a photometer having a preferred directional response function while simultaneously optimizing its optical efficiency.

BRIEF DESCRIPTION OF THE DRAWINGS

The novel features that are considered characteristic of the invention are set forth in the appended claims. The invention, itself, however, both as to its organization and its method of operation, together with additional objects and advantages thereof, will best be understood from the following description when read in connection with the accompanying drawings wherein like numbers have been employed in the different figures to denote the same parts and wherein:

FIG. 3 is a sectional side-elevational view of the photometer of FIG. 1 with a positive lens instead of a simple aperture;

FIG. 4 is a graph comprising the directional response functions of the photometers shown in both FIG. 1 and FIG. 3;

INTRODUCTION

Figure 1:
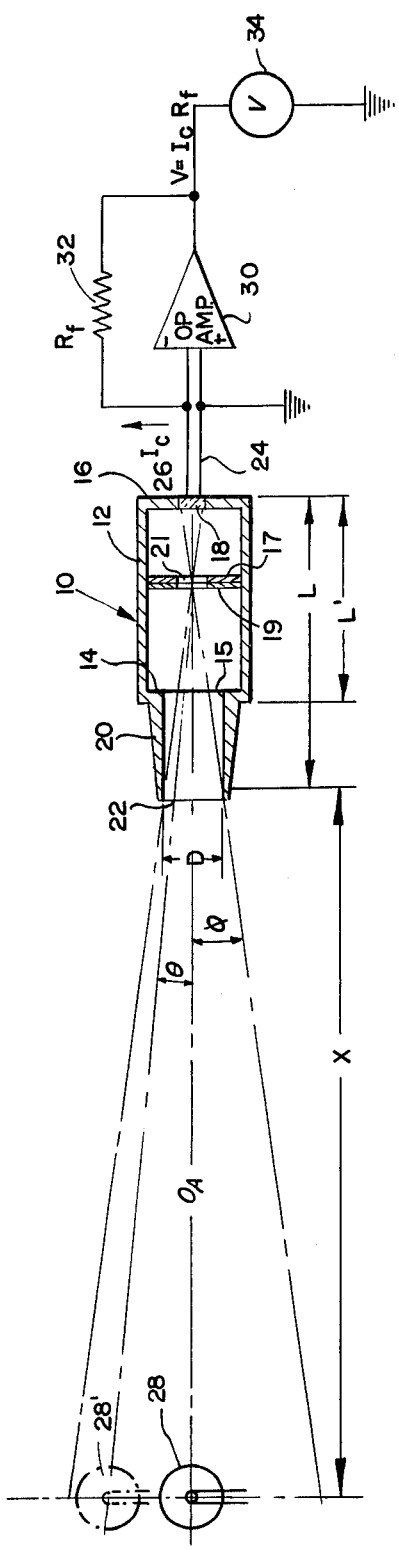
FIG. 1 is a sectional side-elevational view of a simple rotationally symmetric aperture photometer including a schematic of an electronic metering circuit.

Before proceeding to the description of the preferred embodiment, it will be useful to have a more precise definition of what is meant by a "directional response" as applied to a unicell photometer and to illustrate how it is measured for two typical unicell photometers commonly known in the art. This information will then be applied to the present invention and its performance contrasted with the two examples.

To begin with, it will be assumed that the local surface sensitivity of the detector is uniform, i.e., its electrical response per unit area to a unit of flux will be assumed to be a constant over its photosensitive surface. This assumption is necessary in order to isolate the effects of the optical system on the directional response pattern. If the local surface sensitivity of the cell significantly contributed to the directional response, it would obviously become necessary to separate the contributions of the detector and the optical system into separate components in order to establish what effect the one under study had on the overall performance of the device. Since this invention is concerned with the optical system, the easiest way to evaluate its effect is to eliminate the contribution of the detector by making it uniform. In practice, a type of detector for which these assumptions are, in general, valid is a silicon photodiode which has recently found considerable use in photometric and radiometric applications.

The directional response will now be described. It is a mathematical function that describes the relationship between the on-axis and off-axis responses of a photometer to a constant output luminance source that occupies a small percentage of an otherwise totally black field as the source is positioned at different locations in the field. Its intent is to provide information in the form of a single number to the following question. If a luminance source of a known intensity occupies a fixed area in the field at a known location (specified by any convenient coordinate system, say polar coordinates), what is the magnitude of the electrical response of the detector? After this question has been answered for each location in the field, the total response to any luminance pattern that the photometer sees can be easily calculated since the total response can now be determined by summing up the contributions of each individual response. The directional response, therefore, has the qualities of a spatial transfer function because it allows the calculation of the detector output by using it to operate on any scene luminance distribution pattern provided, of course, the scene information can be appropriately described in consistent coordinates. Mathematically, it may be expressed in analytical closed form if the photometer is, for example, a simple rotationally symmetric system, but a particular photometer may be too complex for closed form analysis. In the latter case, the directional response is typically presented in three dimensional graphical or tabular form and is more easily manipulated mathematically using digital numerical computer techniques. In practice, it is probably more convenient to calculate the response using digital techniques even if the transfer function can be described in closed form since scene luminance distributions generally never can be described analytically.

A second critical assumption in developing a directional response pattern is that the intensity of the radiation incident on the detector will always be high enough to make the detector respond. If in calculations or experiments, the incident radiation is below the detectivity level of the detector, any calculations made will be in error. This can be assumed if, before hand, the particular response of the detector can be established either by actual measurement or from manufacturers data.

Since the output of the photometer will vary with the magnitude of the source, it is convenient to break the directional response up into two components—one which indicates its efficiency and the other its directional character. If the two are combined into one expression, this should become clear. Mathematically, we can say that the absolute directional response function is given by $R = R_o \times f(\theta, \alpha)$ where $R_o$ is the response on-axis, and $f(\theta, \alpha)$ is some position function which when multiplied by the on-axis response gives the response at any other field location, $(\theta, \alpha)$. The function $f(\theta, \alpha)$ will remain invariant once established and is therefore like a transfer function for the system. Here it is called the relative directional response function and is defined as follows.

The relative directional response is defined as the reciprocal of the ratio of the electrical response to a known luminance source located in the center of the field of view of the photometer to the electrical response to the same source when it is positioned in some noncentral location within the field of view. For convenience, it is specified in polar coordinates as $f(\theta, \alpha)$. If the photometer is rotationally symmetric, the absolute function may be given as $R = R_o \times f(\theta)$.

When comparing different systems, it is convenient to compare their on-axis responses, $R_o$, in order to evaluate the difference in optical efficiencies between them. $R_o$, therefore, is directly related to the system $f$-number.

The foregoing background material will now be applied to some specific examples. By using concrete illustrations some of the principles should become clearer.

For simplicity, the examples that will be discussed will be assumed to be rotationally symmetric about their optical axes but obviously, in practice, they need not be.

The first example to be considered is a simple aperture photometer device designated as 10 in FIG. 1 and shown in cross section. The photometer 10 includes a housing 12 having a forward wall 14 and a rear wall 16. Forward wall 14 includes an aperture 15 for admitting radiation into the housing 12. It can be assumed that the aperture 15 is not limiting. Centered in the middle of the rear wall 16 is a detector 18 of the silicon photodiode type which produces a current output when subjected to incident radiation. The detector 18 has a spectral sensitivity approximating that of the photopic visual response curve of the standard photometric observer according to the CIE. Extending outwardly from the forward wall 14 is a flare hood 20. The flare hood 20 limits the amount of stray radiation that can enter the interior of the housing 12. It can be assumed that any stray radiation not blocked by the flare hood 20 and entering the housing 12 is effectively absorbed by any of the well known methods such as flocking on the interior walls of the housing 12. The field of view of the photometer 10 is designated by the semi-field angle $\phi$. The largest opening that will admit light into the photometer is an entrance pupil 22 located in the flare hood 20. The entrance pupil 22 has a diameter designated as D. The distance from the entrance pupil 22 to the active surface of the photodiode 18 is designated as L. Therefore, the $f$-number of the photometer 10 is simply the ratio L/D. If D is, say, 0.3 inches and L is 1.5 inches, the $f$-number is 5.0. This number will be compared with the $f$-number of another example having a lens instead of the clear aperture D, and also with the $f$-number of the invention having similar dimensions. The $f$-number is important because, as you will recall, it is a measure of the peak, on-axis response of the photometer. Included in the photometer device 10 is a pair of apertured blades, 17 and 19, located intermediate the aperture 15 and the photodiode 18 to provide the device 10 with a third aperture 21 which may be varied by moving the blades to reduce the amount of radiation incident upon the surface of the photodiode 18. The blades, 17 and 19, may be of the scanning aperture type used in exposure control systems similar to that disclosed, for example, in U.S. Pat. No. 3,641,889. In that patent, a pair of oppositely moving blades are disclosed that simultaneously provide selectively variable apertures over an objective lens and a photocell for purposes of controlling exposure. In the examples to be discussed, it is to be assumed that the aperture 21 is provided by blades similar to those disclosed in the referenced U.S. patent. The aperture 21, therefore, can be varied to control the output of the photodiode 18. Moreover, in the examples to be discussed, it can be assumed that the aperture 21 had been chosen to be the limiting aperture in each system.

The directional response pattern for the photometer 10 is determined experimentally. Analytical methods using ray tracing principles to generate spot diagrams may be used, but these are usually relatively cumbersome and would, in any event, have to be compared with experimental measurements for verification. In addition, the analytical methods do not easily accommodate situations that represent departures from idealized systems. Therefore, it is believed that the experimental method used here yields more direct and immediate results which accurately describe the directional response function, R.

The method basically involves placing a light source 28 of constant output at some distance in front of the entrance pupil 22 of the photometer 10 and then measuring the electrical output of the detector 18. The distance, $x$, (FIG. 1) should be at least 10 times larger than the diameter of either the filament of the source 28 or its glass envelope, if it has one. The output can be measured using some convenient circuitry. The circuitry illustrated schematically in FIG. 1 involves connecting output terminals, 24 and 26, of detector 18 to a high gain operational amplifier 30 and having its current output, $I_d$, fed through a feedback resistor 32. This produces an output voltage, $V = -I_d R_f$, where $R_f$ is the value of the feedback resistor 32. The output voltage, $V$, is then measured with a high quality voltmeter 34, and a record of the output kept as the source is moved to different locations, such as the one shown in dotted lines in FIG. 1, having an off-axis angular location specified by the angle $\theta$. If the process is repeated for different off-axis locations throughout the field of view, the reciprocal of the ratio of responses, i.e., voltages, at each location gives the desired relative directional response function, $f(\theta)$.

Figure 2:
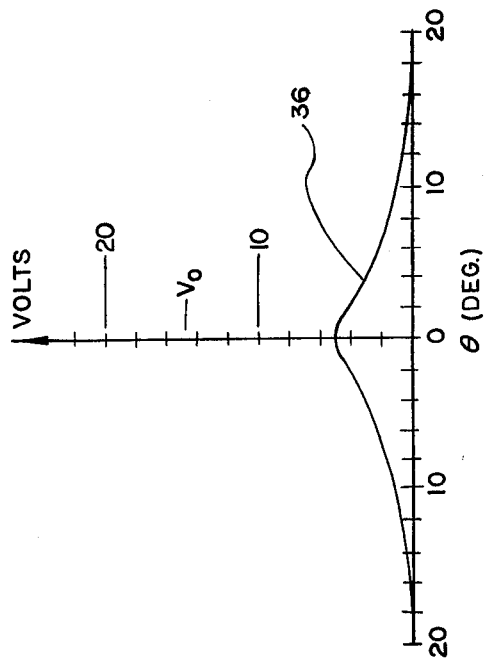
FIG. 2 is a graph showing the directional response function of the photometer of FIG. 1.

An example of an absolute directional (absolute meaning one source of known intensity) response function for the photometer 10 is shown in FIG. 2 and is designated as curve 36. The on-axis response, $\theta = 0°$, corresponds to the maximum voltage, $V_o$, which corresponds to $R_o$. All other points give those voltages measured off-axis. If the response is normalized with respect to the on-axis voltage, i.e., $R_o = 1$, then the directional response pattern of FIG. 2 becomes the relative directional response pattern, $R = f(\theta)$, where $f(\theta) = V_\theta/V_o$ and $R_o = 1.0$. The angular coordinates in FIG. 2 may be given any interpretation consistent with the way in which the photometer is aimed or oriented with respect to the scene. For example, the source may be left or right of center or above or below center.

To repeat, it is useful to have both the relative response function, $V_\theta/V_o$, and the absolute response function $R = V_o \times (V_\theta/V_o)$ when comparing the performance of one system to another since the absolute function gives a measure of on-axis efficiency, which is related to the $f$-number, and the relative function tells the relative importance or weight that a particular photometer will assign to an object located within its field.

Now a second photometer will be considered. It is designated as 40 in FIG. 3. It is exactly the same as the photometer 10 with one exception; it has a positive lens 42 located in the front wall 14 of the housing 12. The diameter of the lens 42 is D, the same as the diameter of the entrance pupil 22 in the photometer 10. If it is assumed that the power of the lens 42 is chosen so that an observer on the surface of the detector 18 does not see the edges of the entrance pupil 22, i.e., there is no barrel vignetting, the f-number of the photometer 40 is given by $L'/D$. if $L' = 1.0$ inches, the f-number is $1.0/0.3 = 3.33$. Since the illumination on axis is proportional to the square of the f-number and the detector output proportional to illumination, the ratio of the squares of the f-number for the two photometers, 10 and 40, can be compared to evaluate their relative ability to collect light. If this is done, the peak voltage for the photometer 40 should be higher than the peak voltage for the photometer 10. This means that the photometer 40 is a much more efficient energy collector and will be able to detect objects at smaller luminances than would the photometer 10, at least on-axis.

The directional response function for the photometer 40 is shown in FIG. 4 as a curve 44. For comparison, FIG. 4 includes the response curve 36 of the photometer 10. The peak response of the photometer 40 is seen to be much higher than that of the photometer 10. By going back to the function relating output voltage to incident illumination on the bare detector surface, one could calculate exactly how close this number corresponds to the theoretical differences. To obtain the total improvement in efficiency, however, it would be necessary to compare the areas under the two curves 36 and 38.

What is interesting about the directional patterns of these two photometers is that they accept radiation from substantially the same field of view, or as is seen in FIG. 4, a semi-field angle of approximately 16°. The striking difference between them, of course, is the way the radiation is distributed over the surface of the detector 18.

As stated before, the relative directional response function indicates the relative importance a photometer will assign to objects it sees within its field of view. We can, therefore, use the curves, 36 and 44, to try to interpret the performance of the photometers 10 and 40 in evaluating scenes. This, of course, may be dangerous at this stage because no assumptions have been made with regard to what type of scenes are expected to be seen by each. Therefore, only generalizations can be made.

Photometer 40 would place a heavy emphasis on objects in the center of the scene and sharply limit the importance of objects beyond a semi-field angle of approximately 2°. It would probably be a relatively good spot meter but would be an unlikely candidate for an automatic exposure control system. Photometer 10 would not respond to as many objects as photometer 40 and would assign relatively greater importance to off-axis objects. In fact, probably too much. Therefore, a compromise directional relative response function would seem more appropriate, but one which retains the efficiency of the photometer 40.

Obviously, it is the lens that improves the efficiency of the photometer 40 and the absence of the lens in the photometer 10 that flattens out its relative directional response function. The present invention combines the attributes of both of these photometers by providing an optical element in place of the lens 42, in the photometer 40, that has some of the properties of a clear aperture. It will be seen that a preferred directional response curve is achieved while maintaining the separation distance, $L^1$, constant and at the same time having the greater efficiency characteristic achieved using the lens 42.

THE PREFERRED EMBODIMENT

Figure 5:
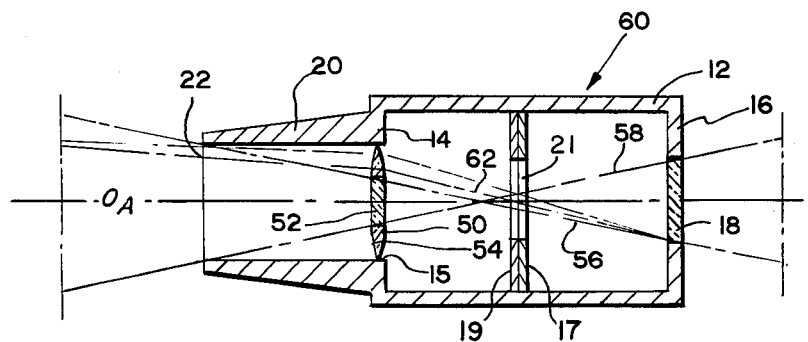
FIG. 5 is a side elevational view of the photometer of FIG. 1 having the optical element of the invention instead of a simple aperture.

FIG. 5 shown another photometer 60 having identical dimensions to the photometers 10 and 40 but somewhat enlarged for clarity. In place of the lens 42, of the photometer 40, however, is an optical element 50. The element 50 consists of a planar central portion 52 of uniform thickness surrounded by an annular rotationally symmetric circular portion 54, concentric with portion 52, and having a radially decreasing thickness having some refracting power. The portion 54 may be either prismatic as shown or it may have curved surfaces.

Figure 7:
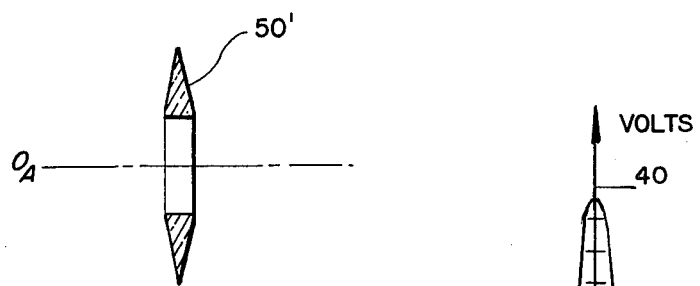
FIG. 7 is a cross sectional view of an alternative embodiment of the optical element of the photometer of FIG. 5.

The proportions of the portions 52 and 54 are determined as follows. Draw extreme rays from the edges of the detector 18 out of the photometer 60 to the corners of the entrance pupil 22. These rays are shown as rays 56 and 58. The intersection of the rays 56 and 58 with a plane perpendicular to the plane of FIG. 5 and through the middle of the forward wall 14, i.e., in a plane containing the aperture 15, determine the diameter of the flat portion or window 52. It should be noted that no material is actually needed in this region but its use is advised to keep the interior of the photometer free from dust. Therefore, any loss in energy transmission due to the presence of the flat window portion 52 is considered negligible considering the tradeoff with keeping the interior of the photometer clean. An alternative embodiment for the optical element 50 with a clear aperture in place of the portion 52 is shown in FIG. 7 and designated with the numeral $50^1$.

To determine the exact shape of the portions 54, extreme rays, such as those shown as the rays, 60 and 62, are projected out of the photometer using different materials and curvatures for the portion 54 until the right combination is arrived at which will permit a ray, like ray 60 to get out of the photometer just touching the edge of the entrance pupil 22.

Figure 6:
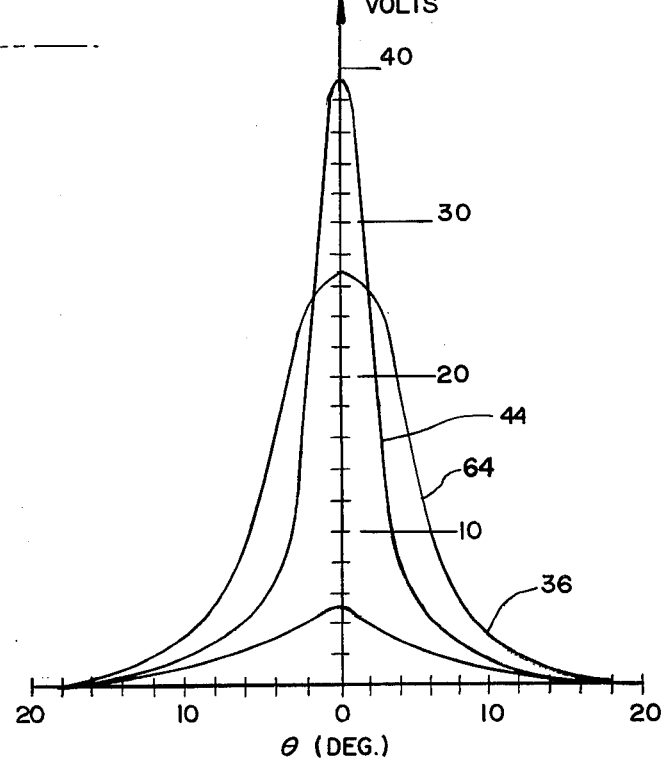
FIG. 6 is a graph comparing the directional response functions of the photometers of FIGS. 1 and 3 and that of the invention.

The result of using the optical element 50 is shown by plotting its directional response function in FIG. 6 along with the functions 36 and 44 of the previously discussed photometers. Function 64 has a peak response less than the peak of photometer 40, the total area under its curve is substantially the same as that under the curve 44 and it is not quite as sharp as curve 4. Its f-number incidentally is the same as that of the photometer 40, which accounts for their areas being quite close. By contrast with the curve 36, it does not give as much weight to extreme off-axis objects yet still has substantially the same field of view of both of the previous photometers. Further, it is believed that this response function will, in general, give more consistent exposure predictions than either of the two previously examined.

It should be clear by examining FIG. 6 that curve 64 is achieved because optical element 50 combines the characteristics of a clear aperture, curve 36, and those of a positive lens, curve 44. If it is assumed that all the curves in FIG. 6 can be mathematically expressed as an exponential function of the form, say, $R(\theta) = R_o e^{-K\theta^2}$, where $R_o$ is the on-axis response and $K$ is a constant which is a measure of the rate at which the curves decrease as a function of the angular field position of the source 28, then, it can be seen that curve 64 has a rate of decrease that is intermediate the rates of decrease for curves 36 and 44, i.e., between their $K$'s. This is simply another way of viewing the effect of the optical element 50 compared to either a clear aperture or a positive lens separately.

Consequently, when the separation distance is a restriction, as it might be, for example, in shutter design where space and component density in a shutter housing are overriding considerations, the present invention provides a simple solution to the problems of high efficiency and desirable directional response functions.

It is believed that those familiar with the photographic arts will readily appreciate the novel and unique advantages inherent in this invention. For example, there is no reason why the invention could not be incorporated as a component of a camera exposure control system such as those disclosed, for example, in U.S. Pat. Nos. 3,821,547 and 3,641,889. In this application, the output of the photometer device can be used as an analog input feedback signal to control when the shutter mechanisms, disclosed in the aforementioned U.S. patents, open and close to yield an appropriate exposure. In addition, the photometer of the present invention may easily be converted to use as a radiometer for measuring the irradiance of either uniform sources or groups of randomly distributed objects having different irradiances provided, of course, the user understands what is being measured in the latter case. This would be accomplished by changing the spectral sensitivity of the detector.

This invention may be practiced or embodied in still other ways without departing from its spirit or essential character. The embodiment described herein is therefore illustrative and not restrictive, the scope of the invention being indicated in the appended claims.

What is claimed is:

1. A radiation measuring device comprising;
    a photoelectric transducer having a central axis and a photosensitive surface of given dimensions substantially perpendicular to said central axis;
    an antiflare bezel extending around said axis in front of said transducer and having an open end for admitting radiation therethrough;
    means for defining a variable limiting aperture positioned intermediate said open end of said bezel and said photoelectric transducer; and
    an optical element positioned along said axis intermediate said open end of said bezel and said transducer, said optical element in combination with said given dimensions of said photosensitive surface defining the field of view of said device, said optical element collecting radiation from within the field of view of said device to selectively direct said radiation toward said photosensitive surface of said transducer, said optical element including a first portion radially spaced away from said central axis to provide said device with a first directional response pattern to a discrete constant energy source positioned a given distance away from and in front of said device such that when said source is moved across the field of view of said device at said given distance said first directional response pattern includes a peak on-axis response which exponentially decreases as a function of the angular field position of said source such that said response equals zero when the source is outside of the field of view of said device and a second portion extending radially outward from said central axis to meet said first portion of said optical element to provide said device with a second directional response pattern to the source having a peak on-axis response lower than that of said first directional response pattern and which exponentially decreases as a function of the angular field position of said source at a lower rate than the exponential decrease of said first directional response pattern so that said first and second directional response patterns, when combined, provide said device with a preferred directional response pattern to the source which includes a peak on-axis response less than the peak on-axis response of said first directional response pattern but which exponentially decreases at a rate intermediate the rates of decrease of said first and said second directional response patterns.

2. An improved radiation measuring device for use in photographic exposure prediction applications, the device being of the type including means for collecting radiation from its field of view and directing it toward a photosensitive surface of a photoelectric transducer that responds to incident radiation by converting it to a single electrical output signal that is used to directly indicate an appropriate exposure value or alternatively may be used as an input function for controlling a camera exposure control system, the improvement comprising:
    an optical system mounted in position to view a scene to be photographed and selectively collect radiation from different locations within the field of view of said device and direct said radiation onto the photoelectric transducer said optical system including an optical element having a central planar portion of uniform thickness surrounded by an outer positive lens portion having radially decreasing thickness.

3. The device of claim 2 wherein said central planar portion of said optical element is circular in shape and said outer positive lens portion is an annulus concentric with said central circular portion.

4. The device of claim 3 wherein said optical system further includes a cylindrical shaped flare hood, concentric with said optical element surrounding the periphery thereof and extending outwardly therefrom to a depth sufficient to prevent certain stray radiation from entering said device.

5. An improved radiation measuring device for use in photographic exposure prediction applications, the device being of the type including means for collecting radiation from its field of view and directing it toward a photosensitive surface of a photoelectric transducer that responds to incident radiation by converting it to a single electrical output signal that is used to directly indicate an appropriate exposure value or alternatively may be used as an input function for controlling a camera exposure control system, the improvement comprising:
    an optical system mounted in position to view a scene to be photographed and selectively collect radiation from different locations within the field of view of said device and direct said radiation toward the photoelectric transducer, said optical system including an optical element having a central clear aperture surrounded by an outer positive lens portion having radially decreasing thickness.

6. The device of claim 5 wherein said central clear aperture of said optical element is circular in shape and said outer positive lens portion is an annulus concentric with said central circular clear aperture.

7. The device of claim 6 wherein said optical system further includes a cylindrical shaped flare hood, concentric with said optical element surrounding the periphery thereof and extending outwardly therefrom to a depth sufficient to prevent certain stray radiation from entering said device.

8. A photometer for use in photographic exposure control applications, comprising:
    means for collecting radiation from a field of view of said photometer and directing it toward a photosensitive surface of a photoelectric transducer, said radiation collecting means including an optical system mounted in position to view a scene to be photographed to selectively collect radiation from different locations within the scene, said optical system including an optical element having a central planar portion of uniform thickness surrounded by an outer positive lens portion having radially decreasing thickness; and
    a photoelectric transducer mounted in position to receive radiation collected by said radiation collecting means, said photoelectric transducer being responsive to radiation incident on it by converting said incident radiation to a single electrical output signal whose strength is proportional to the total radiant flux incident upon it, said photoelectric transducer being a silicon photodiode having a spectral sensitivity substantially identical to that of the photopic visual response curve of the standard photometric observer according to the CIE.

9. The device of claim 8 wherein said central planar portion of said optical element is circular in shape and said outer positive lens portion is an annulus concentric with said central circular portion.

10. The device of claim 9 wherein said optical system further includes a cylindrical shaped flare hood, concentric with said optical element surrounding the periphery thereof and extending outwardly therefrom to a depth sufficient to prevent certain stray radiation from entering said device.

* * * * *